United States Patent [19]

Pittinger

[11] 3,994,278

[45] Nov. 30, 1976

[54] ENERGY ROOF

[76] Inventor: A. Lincoln Pittinger, 62 Colonia Miramonte, Scottsdale, Ariz. 85253

[22] Filed: May 6, 1975

[21] Appl. No.: 575,145

[52] U.S. Cl. ............................... 126/271; 126/270; 165/49; 165/53
[51] Int. Cl.² ............................................. F24J 3/02
[58] Field of Search ............ 126/270, 271; 237/1 A; 165/49, 53

[56] References Cited
UNITED STATES PATENTS

| 3,072,920 | 1/1963 | Yellot | 126/271 |
| 3,159,554 | 12/1964 | Mount | 126/271 |
| 3,453,666 | 7/1969 | Hedges | 126/271 |
| 3,563,305 | 2/1971 | Hay | 126/270 |
| 3,620,206 | 11/1971 | Harris | 126/271 |

Primary Examiner—Charles J. Myhre
Assistant Examiner—Daniel J. O'Connor
Attorney, Agent, or Firm—Warren F. B. Lindsley

[57] ABSTRACT

A heating and cooling system utilizing solar radiation as an energy source and a fluid body as a storage medium, the fluid body being distributed over the roof area of a dwelling or other structure with provision for controlling the absorption, storage and delivery of thermal energy to regulate the temperature in the enclosed areas of the structure.

15 Claims, 10 Drawing Figures

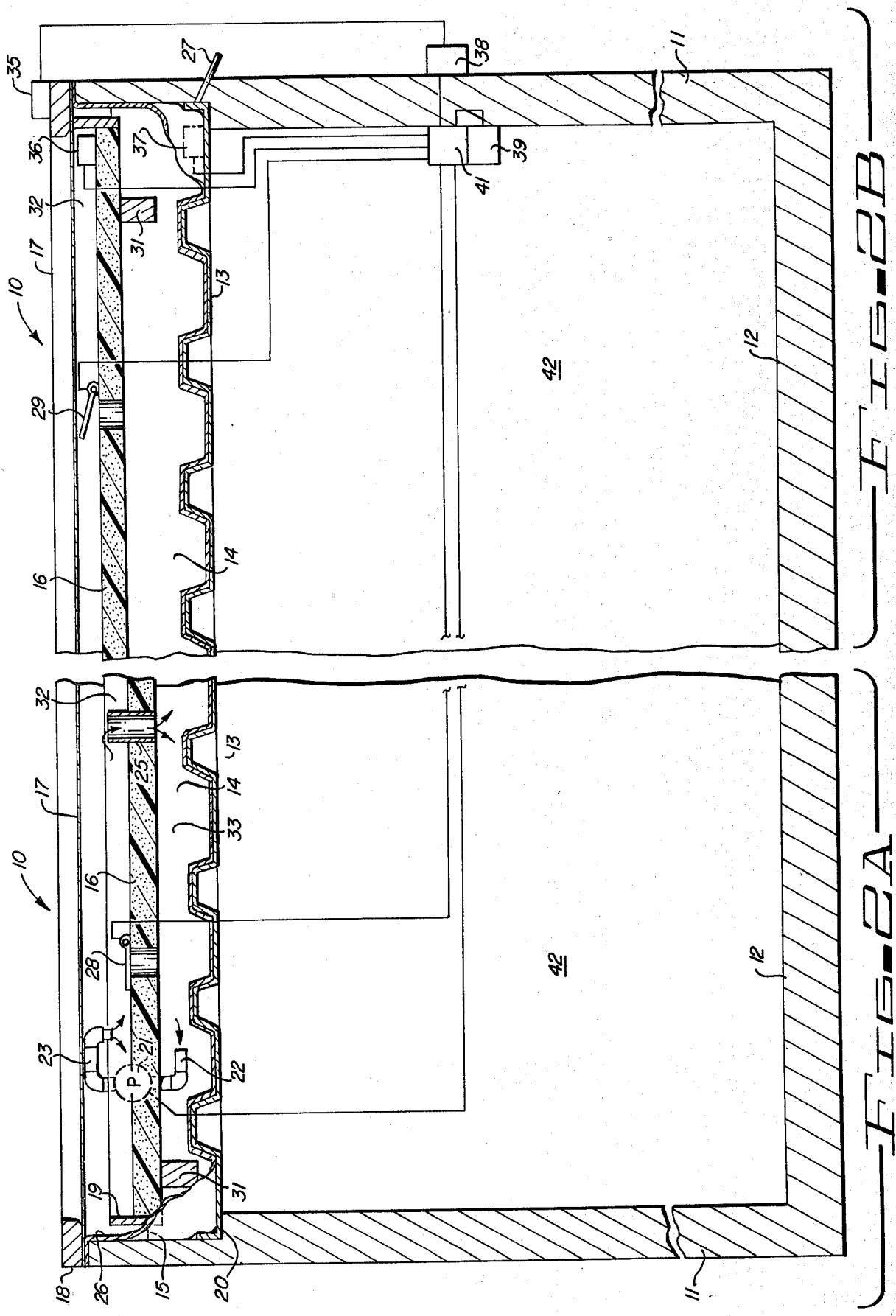

ENERGY ROOF

BACKGROUND OF THE INVENTION

In recent years the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries, for supply. Such a dependence can and does have undesirable effects on the economies of the countries involved and political complications often result. There are also limited sites available that are appropriate for hydroelectric installations.

In the United States, there are a number of fossil fuels available, such as high-sulphur coal and oil shale, but the development and use of these resources has been complicated by economic and environmental concerns which rule against their use for a number of reasons, including the destructive effects of strip mining, atmospheric contamination due to the high sulphur content of the coal, the cost of extracting the oil from the shale, etc.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This untapped source is solar energy. *The World Book Encyclopedia* (copyright 1963, USA) states that the amount of solar energy reaching the earth in 1 day equals the energy that could be produced by burning 550,000,000,000 tons of coal—as much coal as would be dug in the United States in 1,000 years at the 1963 rate of mining. It further states that enough solar energy reaches the United States in 20 minutes to fill the country's entire power needs for 1 year.

The interest in this almost boundless resource and in its development and harnessing for use in homes and factories is rising as other resources dwindle. Its desirability is further enhanced by the fact that solar energy may be converted to practical use without the hazard of environmental contamination.

PRIOR ART

Until recently, the development of solar energy collectors has been associated for the most part with programs involving military and space applications while only limited attention has been given to broad consumer use. As a result, there is a great potential for improvements in existing collection and conversion devices of various types that will result in reduced manufacturing costs and improved thermal efficiencies.

A first type known as a flat plate collector is described by the *World Book Encyclopedia* (copyright 1963). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

Parabolic reflectors have also been utilized along with sun-tracking mechanisms in connection with various schemes for the collection, conversion and utilization of solar energy. Variations of such equipment are described in U.S. Pat. Nos. 495,163 (Apr. 11, 1893); 787,145 (Apr. 11, 1905); 820,127 (May 8, 1906); and 3,713,727 (Jan. 30, 1973). Except for hot water heaters most of these devices are incorporated as elements of a collection and conversion system in which the solar energy collected is converted to mechanical or electrical energy prior to its consumption.

While improved devices of this nature offer significant advantages for specific applications, the inherent thermal inefficiencies of the conversion means tend to compound the difficulty involved in realizing the full potential of the available solar energy.

Probably the most significant opportunity for capitalization on the free availability of solar energy is the prospect for utilizing the collected thermal energy directly for home heating. A measure of the potential for this application of solar energy lies in the fact that in the Southwestern region of the United States, at least five times as much solar energy falls on the roof of the average home as is needed to heat it comfortably. In the typical modern insulated structure, most of this energy is unused while other costly and scarce forms of energy are utilized for heating and cooling.

SUMMARY OF THE INVENTION

In accordance with the invention claimed, an improved heating and cooling system is provided utilizing solar radiation as the energy source and a fluid body as a storage and transport medium.

It is, therefore, one object of this invention to provide an improved heating and cooling system for a home or other enclosed structure.

Another object of this invention is to provide such an improved heating and cooling system which utilizes solar radiation as the primary source of heat energy.

A further object of this invention is to provide such a system which utilizes the collected solar energy directly without conversion to intermediate energy forms such as electrical or mechanical, and thus eliminates the inherent inefficiencies of such conversion processes.

A still further object of this invention is to provide such a system in a form which may, for example, utilize part or all of the total surface area of the roof of the dwelling or other structure for the collection of solar energy.

A still further object of this invention is to provide such a system which permits the use of a distributed fluid (liquid) body such as water as an energy storage medium.

A still further object of this invention is to provide in such a system a simple and effective means for controlling the absorption, storage and delivery of thermal energy as appropriate for the regulation of room temperature in the dwelling or other structure.

A still further object of this invention is to provide in such a system a capability for independently controlling the delivery and removal of thermal energy to and from specific areas of the dwelling or other structure.

A still further object of this invention is to provide such a system in a form which is operable throughout the year without difficult or costly seasonal conversion routines.

A still further object of this invention is to provide such a system in which the control equipment is simple and reliable and requires a minimum of maintenance operations.

Yet another object of this invention is to provide such a system in a form which inherently exhibits a potential for low initial cost, long effective operating life and low cost operation.

A still further object of this invention is to provide a system adaptable to any planform of structure without limitation to rectangular forms.

Further objects and advantages of this invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which:

FIGS. 2–5 each comprise two parts, namely, FIGS. 2A and 2B, 3A and 3B, 4A and 4B, and 5A and 5B;

FIG. 2A is a cross-sectional view of the structure of FIG. 1 taken in the direction of the line 2—2 showing in greater detail the construction of the system and representing control elements involved in its operation;

FIG. 2B is a view similar to FIG. 2A but illustrating the supporting tray in a different position;

DESCRIPTION OF THE PREFERRED EMBODIMENT

Figure 1:
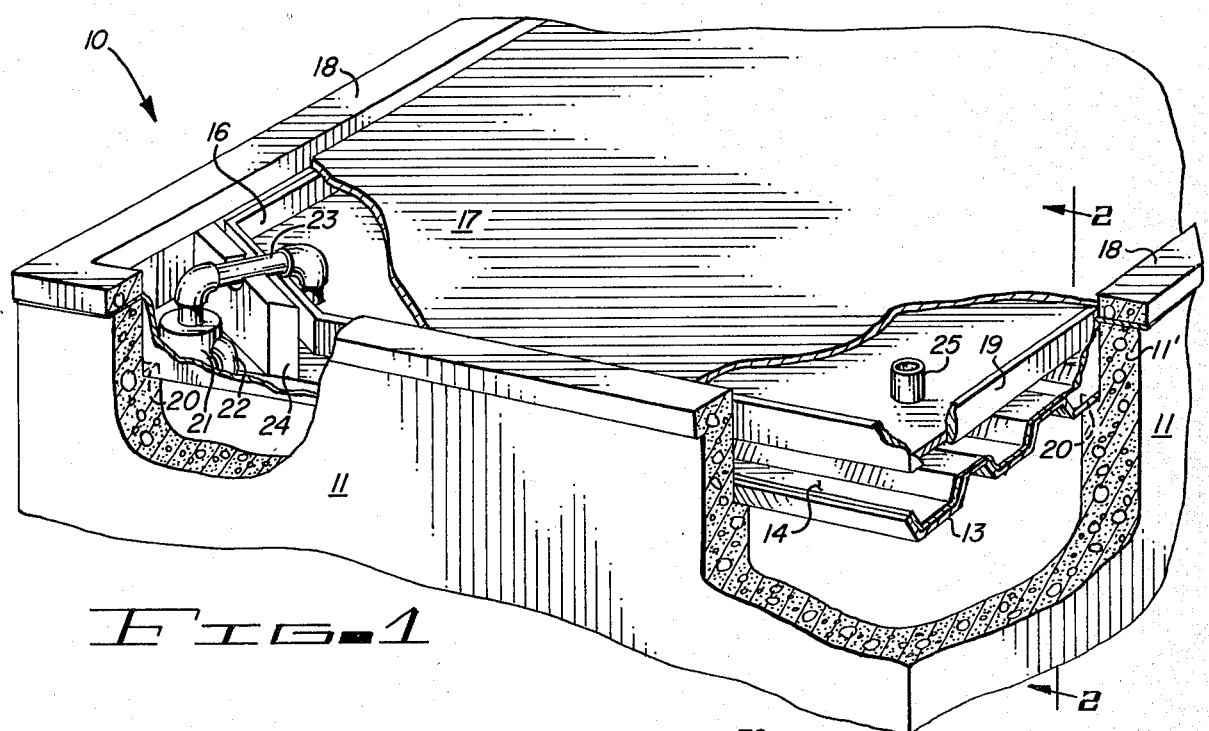
FIG. 1 is an isometric drawing of a model structure incorporating the heating and cooling system of the invention with portions of the structure cut away to reveal details of the inner structure.

Referring more particularly to the drawing by characters of reference, FIGS. 1, 2A and 2B disclose a simple dwelling or other structure 10 represented for purposes of illustration only as a rectangular configuration incorporating the improved heating and cooling system of the invention, and having four vertical walls 11 resting on a foundation or slab floor 12. The system includes as its primary elements a flat horizontal metal ceiling 13, shown herein as being corrugated, installed a short distance below the top of the walls 11 so as to form in cooperation with the upper extremities of the walls 11 a shallow impervious chamber 14. Chamber 14 holds a quantity of liquid 15. A shallow buoyant tray 16 extends substantially from wall-to-wall within chamber 14 and is covered by a transparent cover 17 supported over tray 16 at the top of the walls 11 and secured in place by a retainer cap 18. Cap 18 comprises a plurality of flat strips of wood or other suitable material which are laid over the edges of cover 17 about the perimeter of the top of the vertical side walls 19 of tray 16, thereby serving as a retainer or stop which limits the maximum upward travel of the tray as it floats on the surface of liquid 15.

The portion 11' of the walls 11 extending above the level of ceiling 13 is narrower than the main portion of the wall 11 so that a ledge 20 is formed on which the ceiling 13 is conveniently supported.

A transfer means such as pump 21 which may be located in a corner of chamber 14 or external to the chamber has its intake port 22 positioned at the bottom of chamber 14 and its exhaust port 23 directed into the top of the buoyant tray 16. A baffle 24 in the form of a flat vertical plate installed diagonally across the corner of chamber 14 occupied by the pump 21 isolates the pump 21 from the main body of chamber 14.

An overflow pipe or pipes 25 installed in the bottom of tray 16 and extending vertically upward therefrom to a height just short of the top of walls 19 of tray 16 limits the height of the liquid level within tray 16, the excess liquid flowing through pipe 25 into chamber 14.

Chamber 14 is rendered substantially liquid-tight by means of an impervious liner 26 or other suitable coating which covers the inside vertical surfaces of the portion of walls 11 extending above ceiling 13. Condensation appearing on the outer surface of the liner 26 is removed via a weep drain 27.

The tray 16 is constructed of a cellular foamed plastic or other suitable material which readily floats on the surface of the liquid so that when any of a number of valves 28 or 29 is opened, any liquid contained in tray 16 will drain through valve 28 or 29 into chamber 14 below the tray as the tray rises in the liquid due to the buoyancy of its own mass. The valves 28, 29, etc. may then be closed and the tray 16 again filled with liquid by the action of pump 21. As tray 16 is thus filled with liquid, it settles down into the liquid until it comes to rest at a new level equal to the volume of liquid displaced. A pair of supports 31 in the form of rectangular projections running along two opposite edges of the underside of tray 16 transversely oriented relative to the corrugations of ceiling 13 prevent the under surface of tray 16 from settling completely to the surface of ceiling 13 so that in the lowest position of tray 16, a passage for water remains between the tray 16 and the ceiling 13.

Tray 16 is thus seen to divide chamber 14 into an upper liquid chamber 32 and a lower liquid chamber 33, the volume of the lower chamber 33 being diminished as liquid is pumped into the upper chamber 32.

The relative dimensions of the lower chamber 33 corresponding to the lowered and raised positions of the tray 16 are shown, respectively, by left and right handed segmented illustrations of the tray 16 in FIG. 2.

Ceiling 13 utilizes the corrugated or other inflexible form as illustrated in FIGS. 2A and 2B to provide both structural strength and an increased surface area for reasons to be discussed later.

A number of sensors and control elements are also included in the system as illustrated in FIG. 2. Each of the controls is shown with light lines leading therefrom to the other elements of the system which they control or with which they interact. The sensors, including a sunlight sensor 35, fluid temperature sensors 36 and 37, outside air temperature sensor 38, and inside thermostat 39 provide inputs to a control unit 41 which reacts by controlling the operation of the pump 21 and the valves 28 and 29 in a manner appropriate to effect the desired energy storage and delivery cycles as required to regulate the temperature of structure 10.

When it is desired to store solar energy in the liquid medium, valves 28 and 29 are closed and tray 16 is filled with liquid by the action of pump 21. The tray 16, its liquid charge and the transparent cover 17 comprise an elementary flat plate collector. Solar radiation passes readily through cover 17 and is absorbed as thermal energy by the liquid contents of tray 16. Ideally, cover 17 is made of glass which has a transmittance of approximately 90 percent at the short wave lengths associated with solar radiation, but at the considerably longer wavelengths characteristic of thermal radiation from heated bodies its transmittance is very low. By virtue of these two properties the collected thermal energy is trapped inside the collector and is retained by the liquid storage medium held by tray 16. While these ideal characteristics of glass are only approximated by plastic films and sheets some such materials may be preferred because of their low cost and superior mechanical properties which make them less subject to damage by hail or falling objects. Combinations of glass and plastic may also be utilized to take advantage of the superior properties of both materials. In this instance the cover is presumed to consist of a single air tight sheet of weather resistant, ultra-violet light screening, plastic material of suitable thickness and physical properties. A positive air pressure is maintained within the enclosure to provide air space between the filled tray 16 and the underside of the cover. This action also keeps the cover taunt and prevents flapping due to wind effects.

The delivery cycle which involves the transfer of the collected solar energy to the interior of the air space 42 in the building below ceiling 13, is accomplished by moving the heated liquid from tray 16 to lower chamber 33. By virtue of the high thermal conductivity of the metal ceiling and because of its large surface area afforded by its corrugated form, the thermal energy passes readily from the liquid through ceiling 13 into the space 42, the transfer from ceiling 13 to air being accomplished through radiation and convection.

During daylight hours in cold weather the liquid may be circulated continuously being moved from the lower chamber 33 to the upper chamber 32 by pump 21 and returning to the lower chamber 33 via pipe 25. The liquid is heated during its passage through chamber 22 and its collected heat is released to space 42 as it passes through chamber 33. In an alternate operating mode the tray is filled with liquid and the pumping action is terminated while the charge of liquid in tray 16 is heated. The valves 28 and 29 are then opened allowing the heated liquid to flow into the lower chamber where it remains while heat is transferred to space 42.

In an automatically controlled system utilizing sensors 35–39 and control unit 41, both modes of operation are utilized. During a cold winter day, for example, the first operation in the morning after a cold night would involve the first mode, i.e., with collection and delivery occurring simultaneously at a maximum rate. Pump 21 operates continuously and the heated liquid returns to lower chamber 33 via pipe 25. Once thermostat 39 indicates an adequately high temperature level in space 42, the control unit 41 terminates the action of pump 21. The pumping action is resumed for brief periods throughout the cooler parts of the day as needed to maintain the desired temperature level in space 42. During the remainder of the time when pump 21 is not operated, energy storage is continued with solar energy being collected by the liquid held by tray 16. After sundown as reported to control unit 41 by sensor 35, the operation of pump 21 will be terminated, valves 28 and 29 will be opened and the liquid will be allowed to drain from tray 16 into lower chamber 33. The emptied tray 16 now serves as an insulating barrier over the heated liquid in chamber 33, thereby minimizing thermal loss by convection and conduction through cover 17 to the outside air.

The system may also be employed during the summer to provide cooling. In this mode, the plastic cover is caused to collapse by removing internal air pressure so that the plastic film is in thermal and physical contact with the liquid surface thus serving as a radiating surface but maintaining a closed system with respect to the liquid itself. During the warmer daylight hours, all of the liquid is transferred to lower chamber 33 where if at a lower temperature than the room air, it absorbs heat from space 42 below. When the sun sensor 35 indicates the setting of the sun and sensor 38 indicates outside temperature has fallen sufficiently, pump 21 is activated to transfer liquid to tray 16 (upper chamber 32). When tray 16 is filled, the operation of pump 21 is terminated and the liquid in tray 16 is cooled by radiation to the night sky. Because tray 16 will not hold at one time the total liquid supply, sensors 36 and 37 are utilized to detect an appropriate liquid temperature differential between upper chamber 32 and lower chamber 33 to which controller 41 responds by moving the warmer liquid from lower chamber 33 to upper chamber 32, the cycle continuing until the cooling of the total quantity of liquid is completed. Again, thermostat 39 has a capability to override sensors 36 and 37 in the event the temperature in space 42 is at a desired minimum level, in which case control unit 41 will prevent the operation of pump 21. When sensor 35 detects the rising of the sun in the morning, the tray 16 is again drained by the opening of valves 28 and 29 and the cooled liquid in chamber 33 is then utilized to absorb heat from space 42 throughout the day while the insulating properties of tray 16 provide a barrier against the absorption of energy from the sun.

Figure 3A:
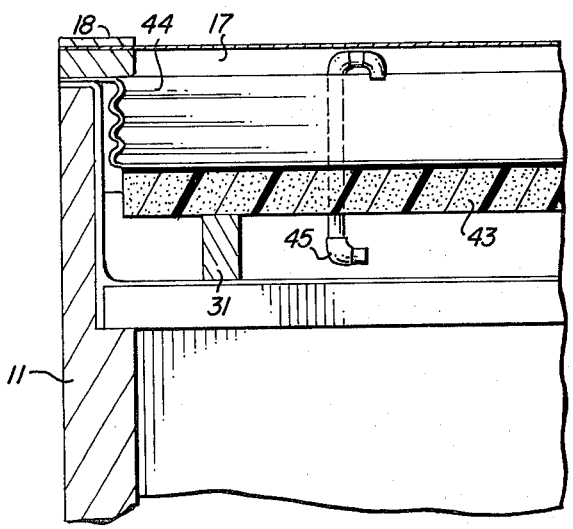
FIGS. 3A, 3B, 4A, 4B, 5A and 5B are cross-sectional views of variations of the structure of FIGS. 1 and 2.
Figure 3B:
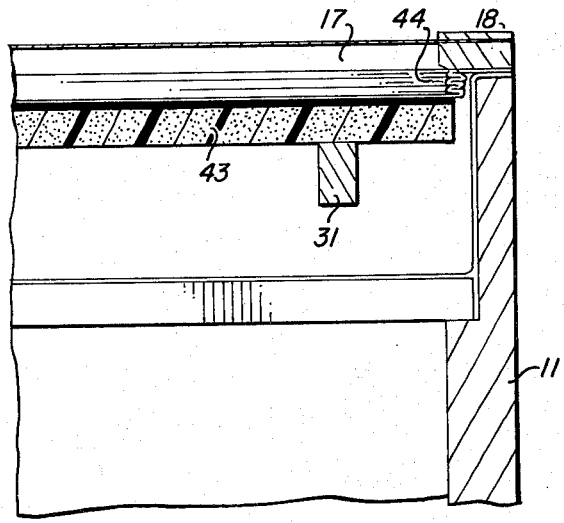
Figure 4A:
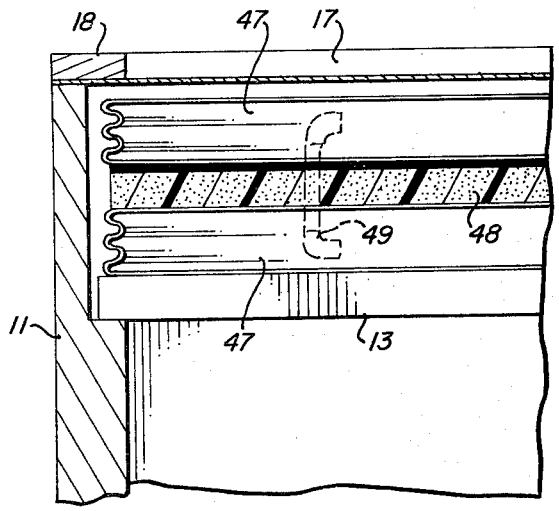
Figure 4B:
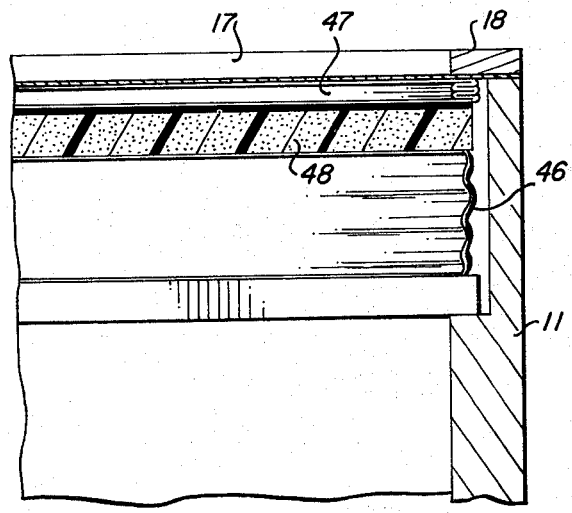

Variations of the system of FIGS. 1 and 2 are shown in FIGS. 3 and 4.

In FIG. 3, the construction of walls 11, ceiling 13, liner 26, cover 17 and cap 18 is the same as in FIGS. 1 and 2. Tray 43 of FIG. 3 is somewhat different, however, from tray 16 of FIGS. 1 and 2. In place of the simple vertical side 19 employed by tray 16, tray 43 utilizes a collapsible liner 44 in the form of a large impervious pliable sheet, such as plastic, rubber or the like materials, the main body of which rests on the flat upper surface of tray 43 with its peripheral edges secured beneath cap 18. The tray 43 is itself simply a flat panel of foamed plastic or other lightweight buoyant material again fitted with supports 31 identical to those provided with tray 16. Segmented left and right hand views of tray 43 again show the lowered and elevated positions, respectively, of tray 43. In the left hand view substantially all of the liquid medium has been transferred by a pump or other transfer means 45 from the lower chamber 33 to the upper chamber 32 where it is held by liner 44; in the right hand view the liquid has been transferred to lower chamber 33 and the tray 43 floating on the surface of the liquid moves upward collapsing the liner 44. Control of the system of FIG. 3 to effect the heating and cooling cycles described earlier can obviously follow the same routines as for the arrangement of FIGS. 1 and 2.

The arrangement of FIG. 4 utilizes a first collapsible impervious bag 46 as the lower chamber and a second transparent impervious collapsible bag 47 as the upper chamber to provide an essentially closed system. Bag 46 rests directly on ceiling 13 with ceiling 13, walls 11, cover 17 and caps 18 again being identical to the corresponding members of FIGS. 1 and 2. Positioned between bags 46 and 47 is a flat panel of foamed plastic or other suitable material 48 which again provided floatation and thermal insulation as in the case of tray 16 of FIGS. 1 and 2 and tray 43 of FIG. 3. A pump means including conduits or other transfer means 49 is again provided to permit transfer of liquid between bags 46 and 47 and the system is thus seen again to be compatible with the heating and cooling cycles described for the arrangement of FIGS. 1 and 2.

Figure 5A:
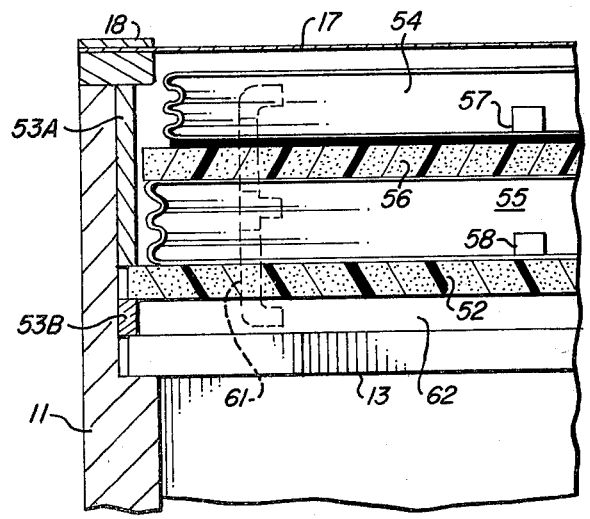
Figure 5B:
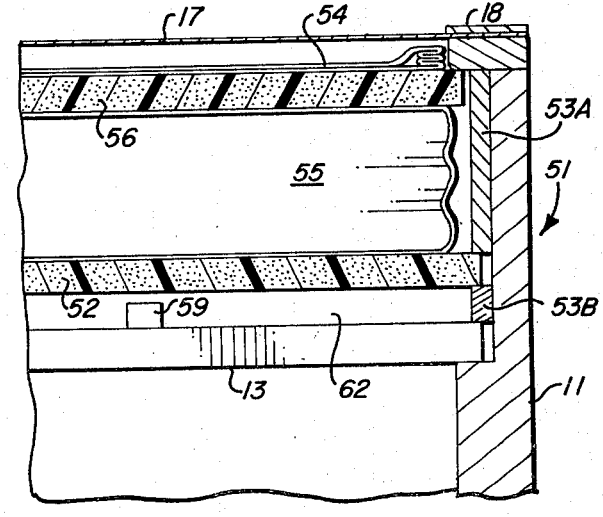

A somewhat more elaborate arrangement offering several advantages over the arrangements of FIGS. 1–4 is shown in FIG. 5. FIG. 5 shows a three-chamber system 51 comprising walls 11 and ceiling 13, both of which may be lined with an impervious lining 26 (not shown), transparent cover 17 and caps 18 which are identical to corresponding elements of FIGS. 1–4 and in addition, a first rigid insulating panel 52 fixedly supported and retained a short distance above ceiling 13 by means of spacers 53A and 53B positioned above and below the edges of sheet 52 around the periphery of ceiling 13 and sheet 52 or by suitable means, first and second collapsible impervious bags 54 and 55, the second of transparent material positioned above the first and separated therefrom by a second rigid buoyant insulating panel 56, liquid temperature sensors 57, 58 and 59 and a fluid transfer means 61. The bags 54 and 55 extend substantially from wall to wall as does the insulating panel 56 but with clearance inside spacers 53A to permit vertical movement therebetween in the motion associated with filling one and collapsing the other. Each of the bags 54 and 55 constitutes a liquid chamber having a volume which is variable to zero while a third chamber 62 lying between the lower surface of panel 52 and the upper surface of ceiling 13 has a constant volume.

Figure 6:
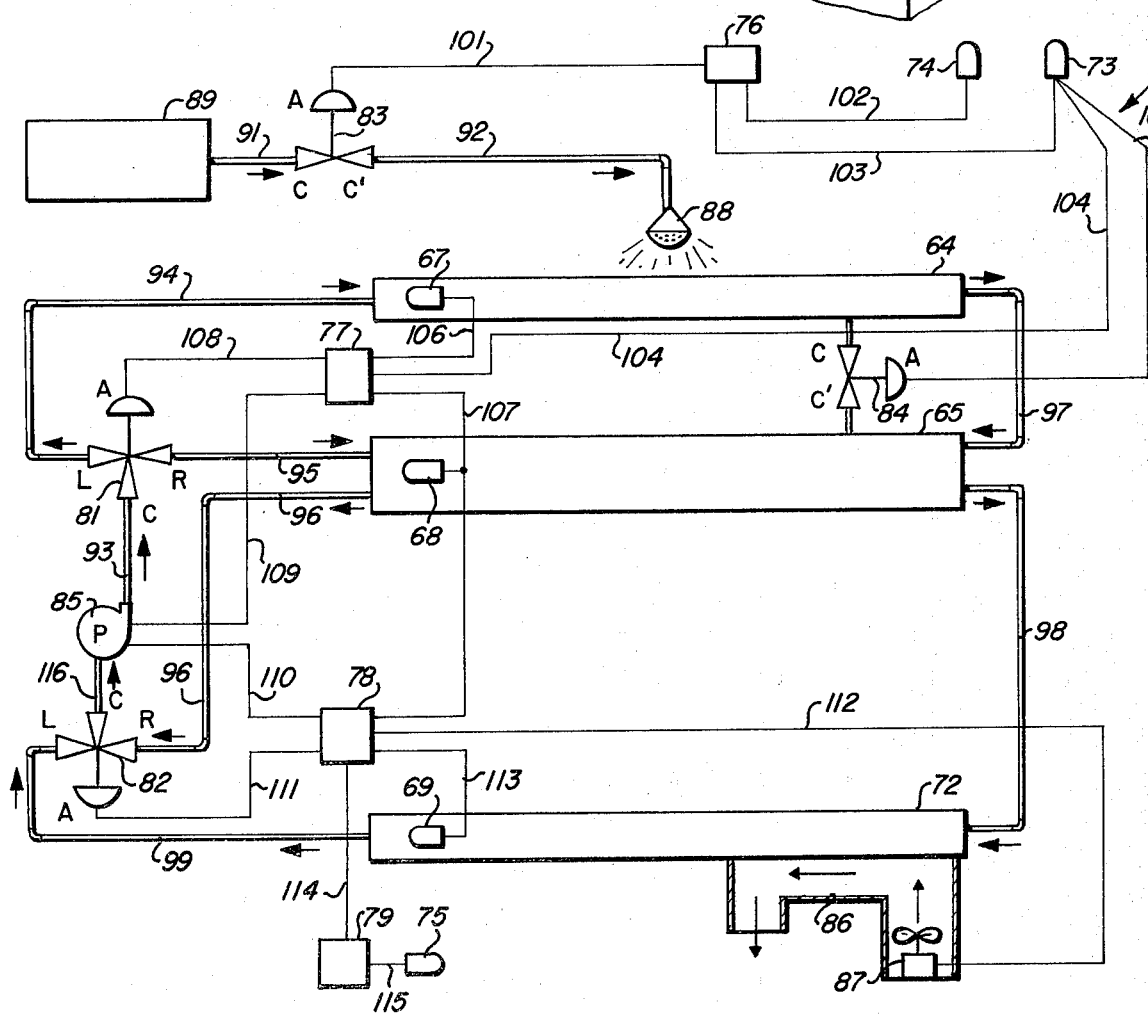
FIG. 6 is a functional block diagram of a complete heating and cooling system incorporating any of the structures of FIGS. 1–5.

FIG. 6 is a block diagram of a heating and cooling system 70 incorporating the three chamber system 51 of FIG. 5. In FIG. 6, the solar collector 64 corresponds to bag 54 of FIG. 5, fluid storage chamber 65 corresponds to bag 55 of FIG. 5 and heat exchanger 72 corresponds to chamber 62 of FIG. 5. Temperature sensors 67, 68 and 69 of FIG. 6 correspond respectively to sensors 57, 58 and 59 of FIG. 5. Three-way or selector valves 81 and 82, ON/OFF valves 83 and 84 and liquid pump 85 correspond to fluid transfer means 61. In addition to the elements already named, the system 70 comprises a sun sensor 73, outdoor air temperature sensor 74, room thermostat 75, logic controls 76, 77 and 78, master temperature control 79, air plenum 86, air circulation fan 87, spray head 88, liquid supply source 89, liquid lines 91–99 and control lines 101–115.

Each of the three-way valves 81 and 82 has an actuator A, while the ON/OFF valves permit or prevent flow between parts C and C' depending upon the signal to actuator A.

Logic controls 76–78 deliver electrical or fluidic signals in response to signals received via input control lines.

Operation of system 70 in the winter mode occurs as follows:

Control 77, responding to positive signals from sun sensor 73 and liquid temperature sensors 67 and 68 activates pump 85, valve 81 and valve 82 through control 78 causing liquid to be pumped from storage chamber 65 into collector 64, the liquid flowing from chamber 65 through line 96, port R to port C of valve 82, line 116, pump 85, line 93, port C to B of valve 81, and line 94 into collector 64. Liquid flow continues as the collector fills and then begins to spill over through line 97 to be recirculated through chamber 65 and back to pump 85. Simultaneously, valve 84 closes in response to sun sensor 73 and the pump 85 may operate continuously or in an optional mode. It may be operative only when sensors 67 and 68 indicate a minimum temperature differential between the liquid in the collector 64 and the water in storage chamber 65, i.e., the liquid in collector 64 is allowed to remain static while a fixed quantity of thermal energy is collected before it is replaced by cooler liquid from chamber 65. This is the collection and storage cycle and it continues throughout the daytime periods when solar energy is available. In a separate and simultaneously operating control cycle, control 78 responds to signals received from master control 79 and thermostat 75, activating pump 85 and appropriately actuating valves 81 and 82 to circulate liquid from chamber 65 through heat exchanger 72, the liquid flow taking a path from pump 85 through line 93, port C to port R of valve 81, line 95 into chamber 65, line 98 to exchanger 72, line 99, port L to port C of valve 82 and line 116 back to pump 85. Typically this flow of liquid in the delivery cycle will be sustained until the temperature sensed by thermostat 75 reaches the set value. As soon as the sun sets as indicated by sensor 73, valve 84 is opened and collector 64 empties through valve 84 into chamber 65, the emptying action being accomplished through the buoyancy of panel 56 of FIG. 5. At the same time, the signal from sensor 73 indicating loss of solar radiation closes passage between ports C and L of valve 81 to cut off the supply of liquid to collector 64 via line 94 and control 77 is prevented from activating the pump 85.

Because controls 77 and 78 under the conditions described may simultaneously call for activation of both the storage and delivery cycles and because the common use of valves 81 and 82 cannot accommodate such simultaneous action, a timer or other means (not shown) is incorporated in the system which appropriately gives priority to either storage or the delivery cycles.

The air circulation system comprising plenum 86 and fan 87 aids in the transfer of heat from exchanger 72 to the circulating room air which is being heated or cooled.

During the hot summer months, the system 70 is converted from the heating to the cooling mode by means of a switch (not shown) which reverses the control logic.

In the cooling mode with the plastic cover collapsed upon the chamber 64 in thermal and physical contact with chamber 64, sun sensor 73 responds to the availability of solar energy by causing valve 84 to open, allowing collector 64 which now functions as an emitter to empty into chamber 65. Liquid in chamber 65 which had been cooled during the night is then circulated through exchanger 72 under the control of thermostat 75 to sustain room temperature at the level set by master control 79. After sunset as signaled by sensor 73, valve 84 is closed and valves 81 and 82 are activated to permit the filling of collector 64 and the subsequent circulation of liquid between collector 64 and chamber 65 in what is now a thermal energy emission cycle in which thermal energy is given up by the liquid medium in collector (emitter) 64 by radiation to the night sky. Further loss of thermal energy may be obtained through adiabatic cooling affects of evaporation. The spray head 88 is incorporated to provide the evaporative effect. Spray water is supplied from water supply source 89. Valve 83 controls the operation of spray head 88 in response to signals from outside air temperature sensor 74 and from sun sensor 73 as interpreted by control 76. Accordingly, the spray water collects on the upper surface of the plastic cover 120 and through adiabatic cooling dissipates heat from chamber 64 to atmosphere.

Time sharing of valves 81 and 82 is required during the night in the cooling mode as it is during daylight in the heating mode.

While the above described system may not be totally adequate for all applications during extremes of temperature in either direction, the potential for energy conservation is obvious and with relatively minor supplementary heating or cooling from auxilliary systems an entirely adequate and economical heating and cooling system may be achieved. Such auxilliary systems may conveniently be incorporated to heat or cool the liquid in the storage or exchanger chambers. If an air circulation system 86 and 87 is employed within the structure auxilliary heating or cooling may be applied to the air as it passes through the plenum 86. As an alternate approach, heating or cooling requirements may be reduced by improvements in the building wall insulation system such as by banking earth against walls exposed to the direct sun, through the use of roof overhang and through use of exteriorly applied insulation, etc.

The total capability of the system also may be enhanced by utilizing garage and patio roof areas for energy collection and dissipation and by segmenting the liquid chambers to permit selective heating or cooling of individual rooms in a dwelling or other structure. In some cases, it may be possible to provide heating and cooling to multi-storied buildings through use of absorber/storage units located in overhangs and terraces as well as the roof with heat exchange ceiling units located within the lower rooms of the structure.

Further, the liquid, if water, used in the system may have dissolved therein chemical compounds which prevent freezing of the water and growth of biological organisms. Still further, the water may have dissolved therein an opacifying material comprising a nigrosine dye or color darkening agent.

While application to home heating and cooling is paramount, other applications are apparent including animal and produce shelters, warehouses, factories, office buildings, stores, school and other commercial buildings.

A novel and effective heating and cooling system making efficient use of the most abundant and readily available energy source is thus provided in accordance with the objects of the invention.

Although but a few embodiments of the present invention have been illustrated and described, it will be apparent to those skilled in the art that various changes and modifications may be made therein without departing from the spirit of the invention or from the scope of the appended claims.

What is claimed is:

1. An apparatus for heat collection, storage and thermal exchange within a building comprising in combination:
   a structural portion of the building capable of thermal exchange with space within said building and having a first chamber with walls constructed to withstand the pressure of a liquid filling said first chamber,
   means defining a second chamber separated from said first chamber by a member floatable on the liquid in said first chamber,
   a conduit interconnecting said first chamber with said second chamber,
   transfer means connected to said conduit for moving the liquid between said first and second chambers,
   said second chamber having an opening exposing the liquid therein to zenith sky, and
   a pair of sensor means for controlling the operation of said transfer means,
   one of said sensor means being actuated upon exposure to solar radiation,
   the other of said sensor means measuring the temperature of the liquid in said first chamber.

2. The apparatus set forth in claim 1 in further combination with:
   an overflow hollow pipe means extending through said member a predetermined distance within said second chamber,
   whereby the liquid when reaching a predetermined level in said second chamber overflows said pipe means and flows therethrough into said first chamber.

3. The apparatus set forth in claim 1 in further combination with:
   valve means extending through said member for controlling the liquid flow between said second and first chambers.

4. The apparatus set forth in claim 1 wherein:
   said structural portion comprises a roof of said building.

5. The apparatus set forth in claim 1 in further combination with:
   a transparent cover for covering said opening of said second chamber.

6. The apparatus set forth in claim 1 wherein:
   said structural portion comprises a roof of said building, and
   said first and second chambers are expandable and contractable in size and liquid volume storing capacity.

7. The apparatus set forth in claim 6 wherein:
   said first chamber contracts in size as said second chamber expands in size and vice versa.

8. The apparatus set forth in claim 1 wherein:
   the surface of said member juxtapositioned to said second chamber being provided with a coating which has a capacity for absorbing a maximum portion of solar energy falling upon said surface.

9. The apparatus set forth in claim 1 wherein:
   said structural portion is external of walls of the building defining said space.

10. The apparatus set forth in claim 1 wherein:
said walls of said means defining said first cavity portion adjacent said space within said building being of a substantially inflexible configuration.

11. An apparatus for heat absorption, storage and thermal exchange within a building comprising in combination:
a substantially horizontal roof structural portion of the building capable of thermal exchange with space immediately below it within said building and having a first impervious chamber with walls constructed to withstand the pressure of a liquid filling said first chamber,
a means defining a second impervious chamber vertically separated from said first chamber,
means defining a third impervious chamber vertically separated from said second chamber by a member floatable on the liquid in said second chamber,
conduit means for selectively interconnecting said first, second and third chambers,
transfer means connected to said conduit means for selectively moving the liquid to and from said first, second and third chambers,
said third chamber having an opening exposing the liquid therein to the zenith sky,
said first chamber comprises a fixed volume,
the volume of second and third chambers being variable during use,
a plurality of sensor means one for each of said chambers and one solar energy sensor,
said sensor means for said first, second and third chambers being actuated by temperature, and
logic means for connecting said plurality of sensor means to said transfer means for moving liquid from either of said first and second chambers to said third chamber upon energization of said sensor means for said third chamber,
said solar energy sensor controlling said logic means.

12. The apparatus set forth in claim 11 wherein:
said liquid comprises water.

13. The apparatus set forth in claim 12 wherein:
said water has dissolved therein chemical compounds which prevent freezing of the water and growth of biological organisms.

14. The apparatus set forth in claim 12 wherein:
said water has dissolved therein an opacifying material comprising a nigrosine dye.

15. The apparatus set forth in claim 12 wherein:
said water has dissolved therein a color darkening agent.

* * * * *